(12) United States Patent
Farquhar et al.

(10) Patent No.: US 6,779,840 B1
(45) Date of Patent: Aug. 24, 2004

(54) LOCKING AND UNLOCKING MECHANISM FOR AN ACTIVE HEADREST FOR A VEHICLE SEAT

(75) Inventors: Mark Farquhar, Ortonville, MI (US); Mladen Humer, Eastpointe, MI (US); Kaur Grewal, Canton, MI (US); Kar Low, Southfield, MI (US); Kenneth McQueen, Leonrad, MI (US); Nagarjun V. Yetukuri, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/649,021

(22) Filed: Aug. 27, 2003

(51) Int. Cl.$^7$ ................................................. B60N 2/42
(52) U.S. Cl. ............................ 297/216.12; 297/216.13; 297/216.14
(58) Field of Search ....................... 297/216.12, 216.13, 297/216.14, 408

(56) References Cited

U.S. PATENT DOCUMENTS

| | | | |
|---|---|---|---|
| 4,350,389 A | 9/1982 | Pärsson et al. | |
| 5,181,763 A | 1/1993 | Dellanno et al. | |
| 5,290,091 A | 3/1994 | Dellanno et al. | |
| 5,378,043 A | 1/1995 | Viano et al. | |
| 5,711,579 A | 1/1998 | Albrecht | |
| 5,795,019 A | * 8/1998 | Wieclawski | 297/216.12 |
| 5,816,658 A | 10/1998 | Wallis | |
| 5,823,619 A | 10/1998 | Heilig et al. | |
| 5,938,279 A | * 8/1999 | Schubring et al. | 297/216.12 |
| 6,199,947 B1 | 3/2001 | Wiklund | |
| 6,352,285 B1 | * 3/2002 | Schulte et al. | 297/216.13 |
| 6,565,150 B2 | 5/2003 | Fischer et al. | |
| 6,568,753 B1 | * 5/2003 | Watanabe | 297/216.12 |
| 6,604,788 B1 | * 8/2003 | Humer | 297/216.13 |
| 2002/0043858 A1 | 4/2002 | Svantesson et al. | |

FOREIGN PATENT DOCUMENTS

WO 00/35707 6/2000

* cited by examiner

*Primary Examiner*—Peter R. Brown
(74) *Attorney, Agent, or Firm*—Bill C. Panagos

(57) ABSTRACT

A vehicle seat and headrest assembly includes a seatback frame. A headrest assembly is provided and has a cushion portion and an impact target. The headrest assembly is rotatably connected to the seatback frame, wherein a rearward force applied upon the impact target causes the cushion portion to rotate upwardly and forwardly. A headrest assembly biasing member is operatively connected to the headrest assembly and the seatback frame and biases the headrest assembly against rotational movement. A locking mechanism is operatively connected to the headrest assembly and the seatback frame. The locking mechanism is movable between an unlocked position wherein the headrest assembly is permitted to rotate, and a locked position wherein the headrest assembly is prevented from rotating.

20 Claims, 4 Drawing Sheets

LOCKING AND UNLOCKING MECHANISM FOR AN ACTIVE HEADREST FOR A VEHICLE SEAT

BACKGROUND OF THE INVENTION

The present invention relates in general to a system for moving a headrest assembly of a vehicle seat upward and forward in the event of a rear impact, and more particularly to a locking mechanism for such a system.

Improvements in safety mechanisms in the automotive industry continue to be made year after year. One example of such a safety mechanism includes a safety headrest as disclosed in U.S. Pat. No. 5,378,043 to Viano et al.

Headrests are provided to support the head of an occupant during a collision. However, in a rear impact, a vehicle seat occupant may be driven rearwardly to exert a reaction force on the vehicle seat back. The occupant's lower torso generally exerts more force or load initially on the seat back than the occupant's shoulder region. This initial load applied by the occupant's lower torso may cause the seat back to be deflected rearwardly. As the seat back moves rearwardly, separation between the headrest cushion of the vehicle headrest and an occupant's head may increase.

In an attempt to reduce such separation, active headrest mechanisms have been proposed in which the occupant's torso applies a rearward load to an impact target in the vehicle seat. The impact target is connected to the headrest cushion and causes the headrest cushion to move forward upon application of a rearward load on the impact target. The headrest cushion moves forward toward the head of the occupant to reduce the separation or gap between the occupant's head and the headrest cushion during a collision.

SUMMARY OF THE INVENTION

This invention relates to an improved vehicle seat and headrest assembly. The vehicle seat and headrest assembly includes a seatback frame. A headrest assembly is provided and has a cushion portion and an impact target. The headrest assembly is rotatably connected to the seatback frame, wherein a rearward force applied upon the impact target causes the cushion portion to rotate forwardly. A headrest assembly biasing to member is operatively connected to the headrest assembly and the seatback frame and biases the headrest assembly against rotational movement. A locking mechanism is operatively connected to the headrest assembly and the seatback frame. The locking mechanism is movable between an unlocked position wherein the headrest assembly is permitted to rotate, and a locked position wherein the headrest assembly is prevented from rotating.

DETAILED DESCRIPTION OF THE INVENTION

Figure 1:
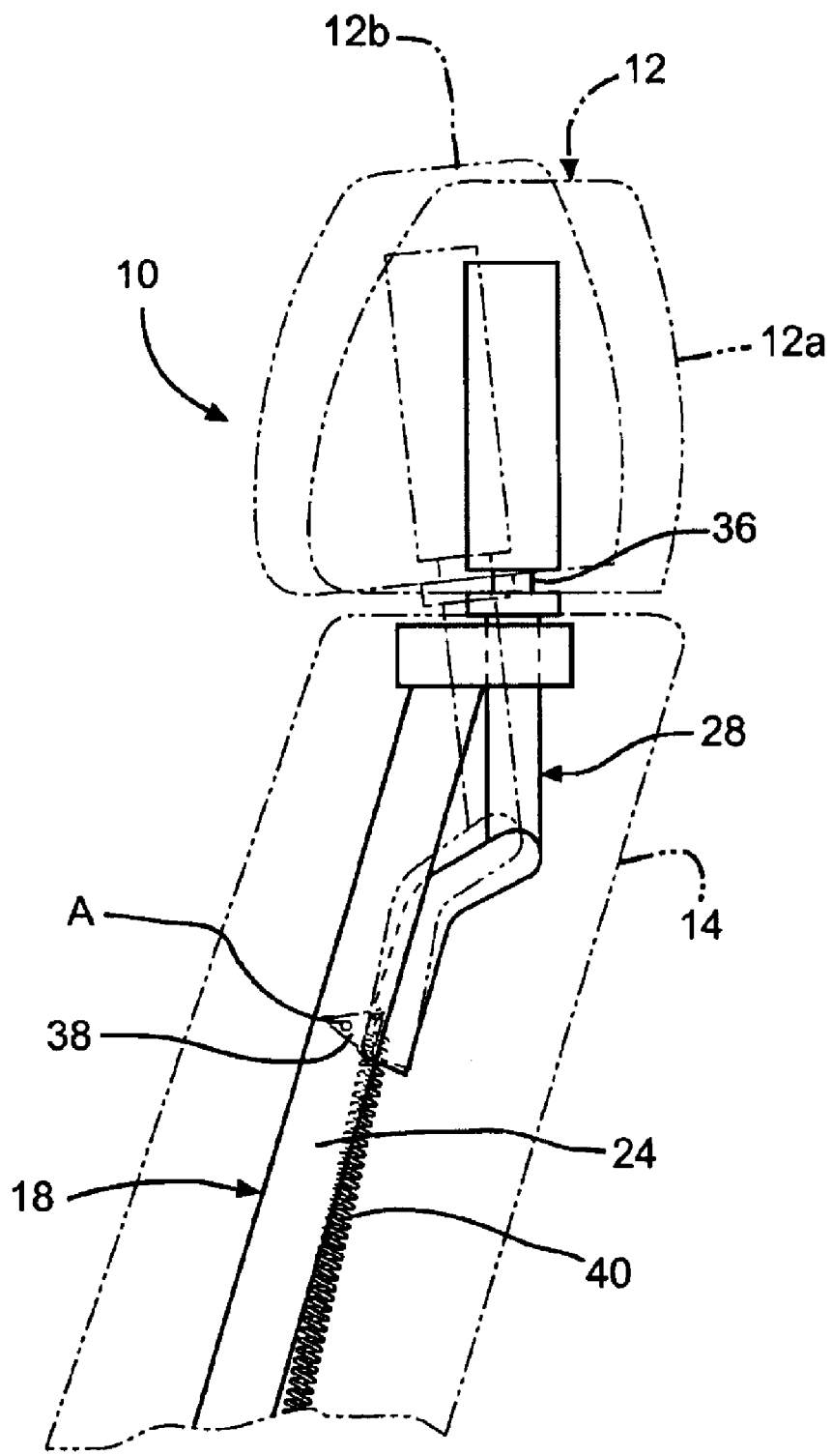
FIG. 1 is a schematic side elevational view showing operation of a headrest assembly according to the present invention.

Referring now to FIG. 1, a vehicle seat 10 is shown in combination with a headrest assembly 12. The vehicle seat 10 includes a seatback 14. A cushion portion 16 of the headrest assembly 12 is retained in a normal position 12a generally aligned with a seatback frame 18 of the vehicle seat 10 during normal vehicle operation. It should be understood that the headrest assembly 12 may be adjusted manually within a generally vertical range of positions in accordance with the invention. Upon rear impact of the vehicle, the cushion portion 16 of the headrest assembly 12 moves, as will be described herein, to an actuated position 12b, which potentially provides support to the head of the occupant.

Figure 2:
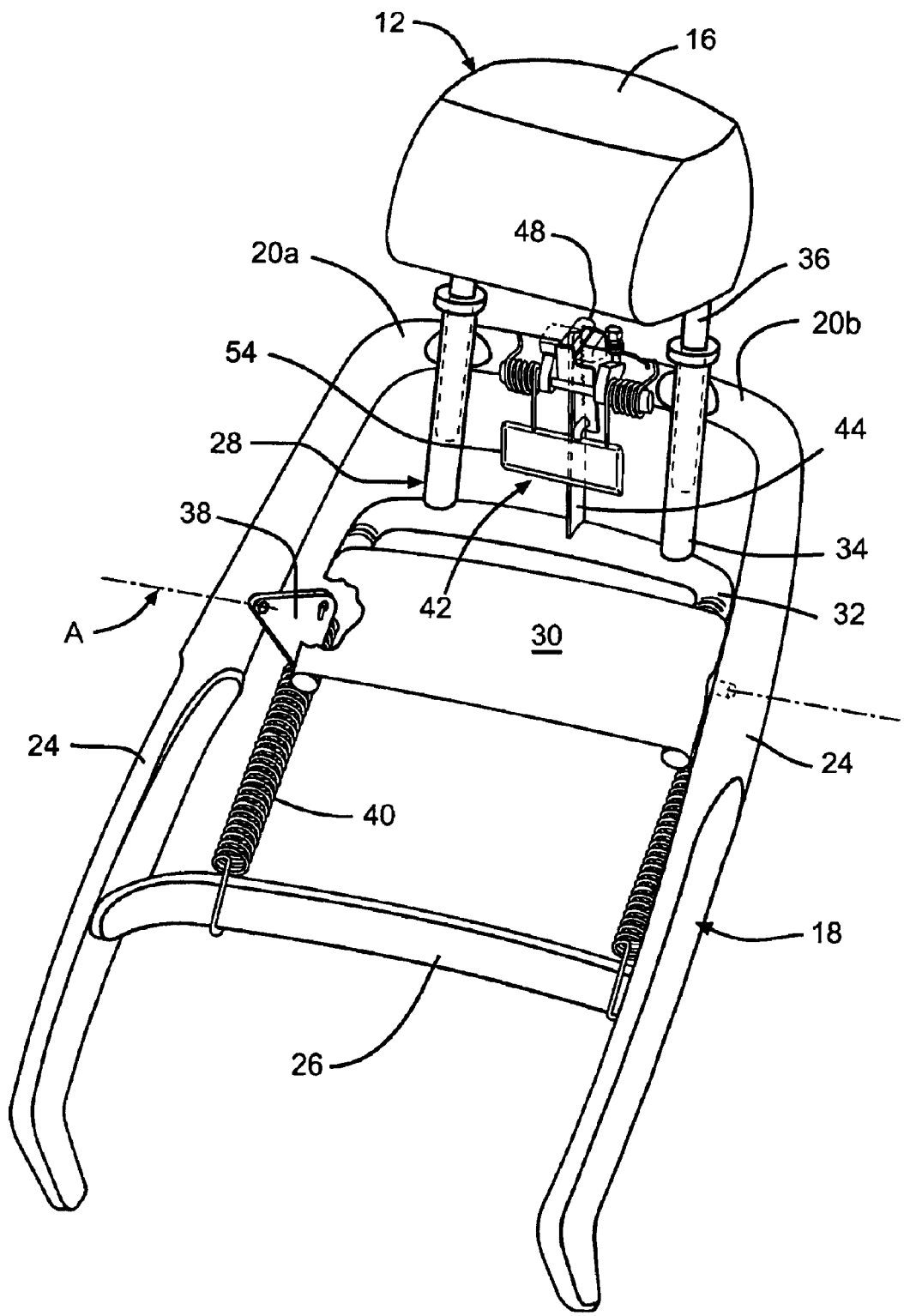
FIG. 2 is a schematic view of a vehicle seat and headrest assembly according to the present invention, showing the locking mechanism.
Figure 3:
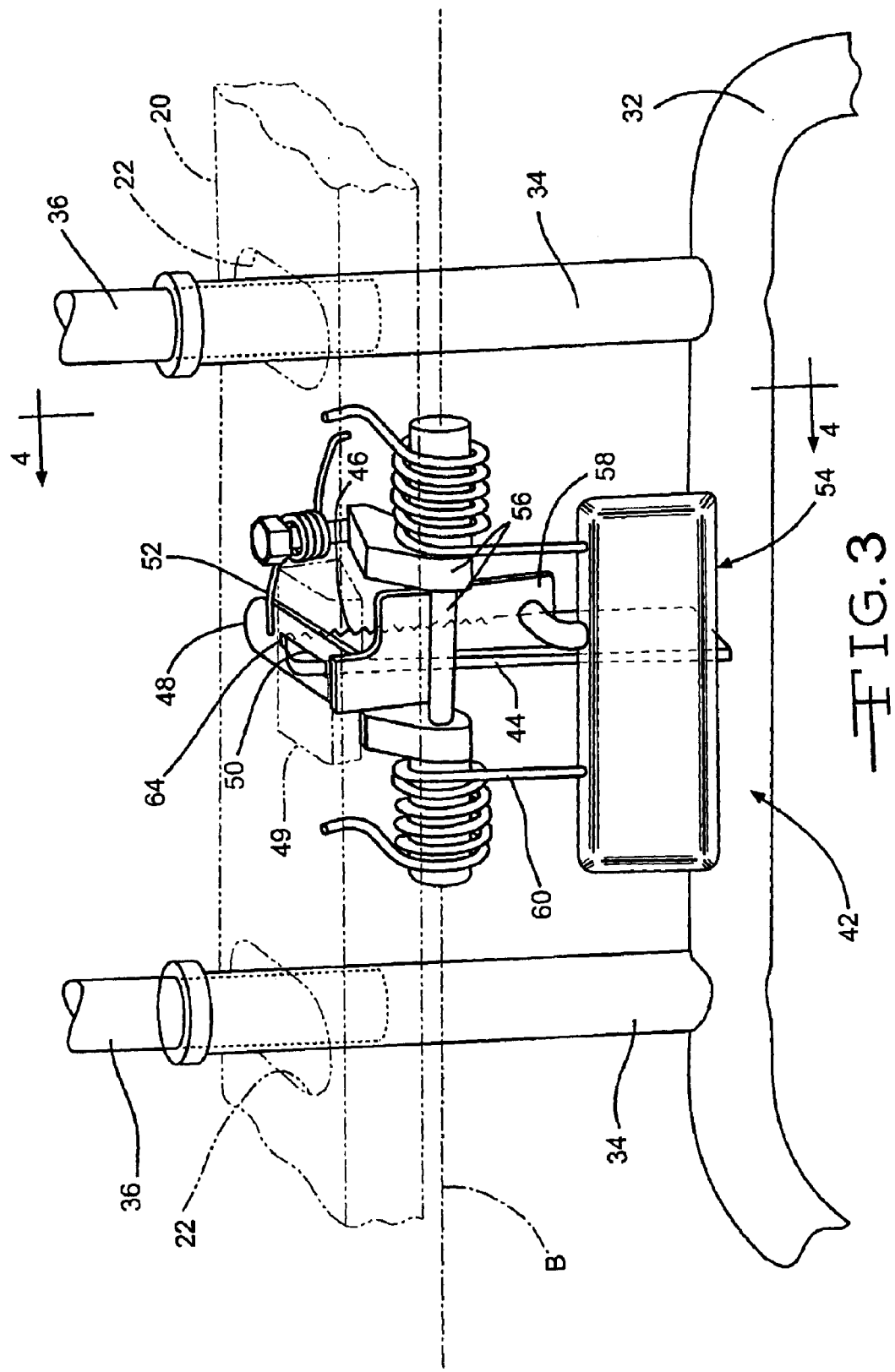
FIG. 3 is an enlarged perspective view of the locking mechanism illustrated in FIG. 2.

Referring now to FIG. 2, the seatback frame 18 in includes an upper cross member that extends between two ends 20a and 20b. Preferably, the upper cross member 20 includes a plurality of apertures 22, as best shown in FIG. 3, in which the headrest assembly 12 is received, however, such apertures are not required. For example, the headrest assembly 12 can be disposed adjacent the upper cross member 20 as shown generally in FIG. 2. The seatback frame 18 further includes side members 24 that may be integrally formed with the upper cross member 20 and extend generally downwardly from the ends 20a and 20b, respectively, of the upper cross member 20. Lower ends of the side members 24 are connected to a lower cross member 26. The lower cross member 26 may be attached to the side members 24 by any suitable means or may be integrally formed in one piece.

The headrest assembly 12 is movably connected to the seatback frame 18 and includes an armature 28 for supporting the cushion portion 16. The armature 28 includes an impact target 30 having a generally U-shaped target frame 32. Risers 34 extend upwardly from the target frame 32. Headrest posts 36 are connected to the risers 34. The risers 34 are preferably movably connected within the apertures 22 of the upper cross member 20. Preferably, the impact target 30 is pivotally connected to the side members 24 with linkages 38 about a pivot axis A. Biasing members, such as coil springs 40 are connected to the linkages 38 and to the lower cross member 26. The coil springs 40 bias the impact target 30 in the normal position 12a. It will be appreciated however, that the springs 46 can alternately be connected to the U-shaped target frame 32.

Although the biasing members are illustrated as coil springs 40, it will be understood that any type of spring or any biasing means, such as an elastomeric member can be used to bias the impact target 30.

The impact target 30 is configured to receive a load from a vehicle seat occupant, and may be formed from any desired material, such as a flexible, semi-flexible, or rigid material. In the event of a relatively severe rear impact to a vehicle in which the vehicle seat 10 is disposed, the occupant's torso applies a rearward load onto the impact target 30 causing the impact target 30 to pivot rearwardly about the pivot axis A (counterclockwise as viewed in FIG. 1). The pivotal movement of the impact target 30 causes the headrest assembly 12 to rotate or move in an upward and forward direction toward the actuated position 12b, as best shown in FIG. 1.

Preferably, the headrest posts 36 are mounted within a bore of the risers 34. More preferably, the risers 34 receive the headrest posts 36 in a sliding relationship to facilitate adjusting the height of the headrest assembly 12 when the headrest assembly 12 is in the normal position 12a.

In normal vehicle seat and headrest assemblies, during the initial stages of a rear impact collision, the occupant's torso is in contact with the seatback 14 but the occupant's head is several inches forward of the cushion portion 16 of the headrest assembly 12. This condition is consistent with the occupant's body being reclined at about 20 degrees from vertical with the occupant's neck being substantially vertical. It will be appreciated however, that the occupant's body can be reclined at any desired angle from vertical. In contrast, the vehicle seat 10 is usually disposed at a reclined angle of about 25 degrees from vertical, and the headrest assembly 12 either follows the contour of the seatback 14 or curves slightly forward. However, for seating comfort, the occupant's head is usually not in contact with the cushion portion 16 during normal driving conditions.

As the occupant loads the seatback 14 during a rear impact, the occupant's torso exerts a force on the seatback 14. Depending upon the compliance of the seatback 14, the occupant compresses into the seatback 14, while the head, neck, and torso move in unison.

Typically, there is a greater compression in the occupant's lower torso, with a gradual reduction of compression up to the shoulder level as the occupant's body remains generally upright. The more severe the rear impact, the greater the extent of the compression of the occupant into the seatback 14. As a rear impact occurs, the initial load of the occupant may cause the seatback 14 to deflect rearwardly. The amount of deflection is related to the bending stiffness of the seatback 14. However, the seatback 14 may deflect under the torso load prior the occupant's head and neck contacting the cushion portion 16 of the headrest assembly 12. Therefore, in a conventional seat, a gap may exist between the occupant's head and the cushion portion 16 of the headrest assembly 12 in a rear impact collision.

In the present invention, the force of the occupant's lower torso against the impact target 30 causes the headrest assembly 12 to move forwardly, or toward the vehicle occupant's head to minimize the gap between the occupant's head and the cushion portion 16. The greater the force of the rear impact, the greater the resultant force exerted by the seat occupant, and the greater the forward movement of the cushion portion 16 toward the occupant's head.

In certain cases during a rear collision, the occupant's chest might reach a peak rearward acceleration significantly before the peak of the rearward acceleration of the occupant's head. For example, the occupant's chest may begin to rebound forwardly just as the occupant's head is reaching its peak rearward acceleration. Consequently, the occupant's head may apply a force to the headrest assembly 12 in the actuated position 12b, thereby moving the headrest assembly 12 rearwardly. Such rearward movement of the headrest assembly 12 by the occupant's head in known as "back driving."

Referring to FIGS. 2 through 5, inclusive, the headrest assembly 12 preferably includes a locking mechanism 42. The locking mechanism 42 substantially decreases back driving during a rear impact, and thereby improves support for the occupant's head and reduces the load on the occupant's neck.

The locking mechanism 42 includes an elongated ratchet 44 having a plurality of ratchet teeth 46. The ratchet 44 is preferably attached to the frame 32 of the headrest assembly 12. A pawl 48 is mounted to the seatback frame 18. Preferably, the pawl 48 is slidably mounted to a portion 49 of the upper cross member 20 of the seatback frame 18. The pawl 48 is preferably generally rectangular and includes an elongated slot 50, however, the pawl 48 can have any desired shape.

A pawl biasing member is attached to the seatback frame 18 and biases the pawl 48 toward the ratchet 44 with a first force F1. Preferably, the pawl biasing member is a first torsion spring 52. Preferably, the first torsion spring 52 has a spring force within the range of from about 10 N to about 16 N. More preferably, the first torsion spring 52 has a spring force of about 13 N. When the slot 50 of the pawl 48 engages the ratchet 44, the locking mechanism 42 is in a locked position. When the slot 50 of the pawl 48 does not engage the ratchet 44, the locking mechanism 42 is in an unlocked position, as best shown in FIGS. 3 and 4.

A paddle 54 is rotatably mounted to a portion 56 of the upper cross member 20 of the seatback frame 18 about an axis B. Preferably, as shown in FIG. 2, the paddle 54 is disposed higher on the seatback frame 18 than the impact target 30.

The paddle 54 includes an upwardly extending a paddle arm 58 in engagement with one end of the pawl 48. A paddle biasing member is attached to the seatback frame 18 and biases the paddle arm 58 toward the pawl 48 with a second force F2. Preferably, the paddle biasing member is a second torsion spring 60. Preferably, the second force F2 exerted by the paddle arm 58 on the pawl 48 is greater than the first force F1 exerted by the pawl 48 toward the ratchet 44, such that the locking mechanism 42 is in the unlocked position. The second torsion spring 60 preferably has a spring force within the range of from about 100 N to about 150 N. More preferably, the second torsion spring 60 has a spring force of about 125 N.

Figure 4:
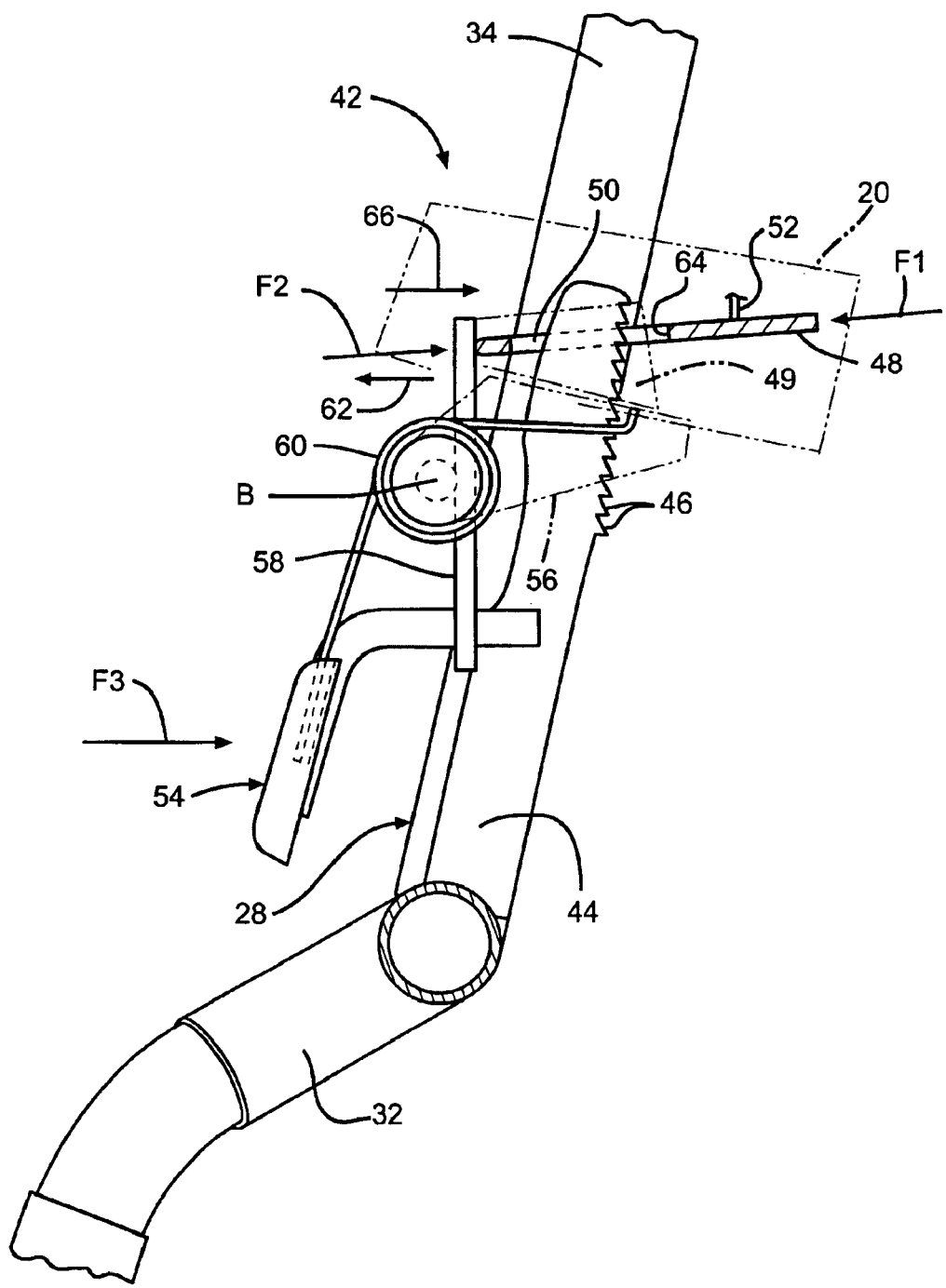
FIG. 4 is a cross sectional view taken along line 4—4 of FIG. 3, showing the locking mechanism in the unlocked position.

The pawl biasing member and the paddle biasing member are shown in the exemplary embodiment illustrated in FIGS. 3 and 4 as first and second torsion springs, 52 and 60, respectively. However, it will be understood that the pawl and paddle biasing members can be any desired type of spring, or any other desired biasing member, such as, for example, an elastomeric band or a hydraulic mechanism.

As will be described herein, when a third force F3 is applied rearwardly to the paddle 54, the paddle 54 rotates about the axis B. Preferably, the third force F3 is within the range of from about 30 N to about 100 N. More preferably, the third force F3 is about 65 N. Such rotation causes the paddle arm 58 to move forwardly in the direction of an arrow 62. The first torsion spring 52 then urges the pawl 48 forwardly, also in the direction of the arrow 62 as viewed in FIG. 4. The forward movement of the pawl 48 allows a rear edge 64 of the slot 50 to engage the teeth 46 of the ratchet 44. When the slot 50 engages any one of the teeth 46 of the ratchet 44, the ratchet is prevented from moving downwardly relative to the pawl 48, and the locking mechanism 42 to the locked position. It will be understood that the rear edge of the slot 50 can engage the ratchet 44 at any tooth 46, thereby providing for a plurality of locked positions for the locking mechanism 42.

When such a rearward force F3 is removed from the paddle 54, the paddle 54 rotates about the axis B, causing the paddle arm 58 to move rearwardly in the direction of an arrow 66. The paddle arm 58 then engages the pawl 48. Because the second force F2 of the paddle arm 58 is greater than the first force F1 of the pawl, the pawl 48 is caused to move rearwardly. The rear edge 64 of the slot 50 then moves away from the teeth 46 of the ratchet 44, thereby moving the locking mechanism 42 to the unlocked position.

In operation, such as during a rear impact, the force of the vehicle occupant's lower torso against the impact target 30 causes the headrest assembly 12 to rotate about the axis A, thereby causing the cushion portion 16 to move forwardly. As the occupant's mid and upper torso continues to move rearwardly, a force, such as the rearward force F3, is applied to the paddle 54, causing the paddle 54 to pivot about the axis B, and causing the paddle arm 58 to move forwardly. The pawl 48, urged by the first torsion spring 52, then slides forwardly allowing the rear edge 64 of the slot 50 to engage the ratchet teeth 46, and moving the locking mechanism 42 to the locked position.

When an occupant's rearwardly moving head engages the cushion portion 16 when the headrest assembly is in the actuated position 12b, the locking mechanism is in the locked position, thereby substantially preventing rearward movement of the cushion portion 16, and substantially preventing back driving.

As the rear impact progresses, the force of the vehicle occupant's head on the cushion portion 16 causes a compressive or clamping force between the ratchet teeth 46 and the pawl 48 and between the frame 49 and the pawl 48. Preferably the clamping force has a range from zero, for example when the pawl 48 does not engage the ratchet teeth 46, to greater than the second force F2, for example when the vehicle occupant's head exerts a force the cushion portion 16 during a rear impact. The vehicle occupant's lower and upper torso may rebound from the seatback 14 before the occupant's head rebounds from the cushion portion 16. In such a situation, the force of the occupant's torso exerted into impact target 30 may be insufficient to prevent back-driving.

As the occupant's torso rebounds, the clamping force between the ratchet teeth 46 and the pawl 48 and between the frame 49 and the pawl 48 is preferably greater than the second force F2, thereby preventing the second force F2 from disengaging the pawl 48 from the teeth 46. When the rear impact is nearly complete, the force of the occupant's head on the cushion portion 16, and therefore the clamping force, is reduced. Once the clamping force drops below a threshold value, such as, for example, below the second force F2, the paddle arm 58 pushes the pawl 48 rearwardly, disengaging the locking mechanism 42 and allowing the headrest assembly 12 to return to the normal position 12a.

After the rear impact, the occupant's torso moves forwardly, removing the force F3 from the paddle 54. When the force F3 is removed from the paddle 54, the paddle arm 58 again applies the rearward force F2 to the pawl 48, moving the pawl 48 rearwardly and causing the locking mechanism 42 to return to the unlocked position.

The principle and mode of operation of this invention has been described in its preferred embodiment. However, it should be noted that this invention may be practiced otherwise than as specifically illustrated and described without departing from its scope. For example, the ratchet 44 and pawl 48 have been described as being mounted to the frame 32 of the headrest assembly 12 and the seatback frame 18, respectively. However, successful results may also be achieved by a locking mechanism which includes a ratchet and a pawl mounted to the seatback frame and the frame of the headrest assembly, respectively.

What is claimed is:

1. A vehicle seat and headrest assembly, comprising:
   a seatback frame;
   a headrest assembly having a cushion portion and an impact target, wherein the headrest assembly is rotatably connected to the seatback frame, and wherein a rearward force upon the impact target causes the cushion portion to rotate forwardly;
   a headrest assembly biasing member operatively connected to the headrest assembly and the seatback frame for biasing the headrest assembly against rotational movement; and
   a locking mechanism operatively connected to the headrest assembly and the seatback frame, the locking mechanism movable between an unlocked position wherein the headrest assembly is permitted to rotate, and a locked position wherein the headrest assembly is prevented from rotating.

2. The vehicle seat and headrest assembly according to claim 1, wherein removal of the rearward force upon the impact target causes the cushion portion to rotate rearwardly.

3. The vehicle seat and headrest assembly according to claim 1, wherein the locking mechanism includes a plurality of locked positions.

4. The vehicle seat and headrest assembly according to claim 1, wherein when the locking mechanism is in the locked position the headrest assembly is prevented from rotating rearwardly.

5. The vehicle seat and headrest assembly according to claim 1, wherein the locking mechanism comprises:
   a ratchet attached to one of the seatback frame and the headrest assembly;
   a pawl attached to the other of the seatback frame and the headrest assembly, wherein when the pawl engages the ratchet, the locking mechanism is in the locked position, and wherein when the pawl does not engage the ratchet, the locking mechanism is in the unlocked position; and
   a paddle attached to one of the seatback frame and the headrest assembly, the paddle being in engagement with one of the ratchet and the pawl to move the one of the ratchet and the pawl, wherein a rearward force upon the paddle moves the locking mechanism to the locked position.

6. The vehicle seat and headrest assembly according to claim 5, wherein removal of the rearward force upon the paddle causes the locking mechanism to move to the unlocked position.

7. The vehicle seat and headrest assembly according to claim 5, wherein the pawl is movably mounted to the seatback frame.

8. The vehicle seat and headrest assembly according to claim 5, wherein the pawl is slidably mounted to the seatback frame.

9. The vehicle seat and headrest assembly according to claim 5, further including a paddle biasing member biasing the paddle against the pawl, thereby biasing the pawl away from the ratchet and moving the locking mechanism to the unlocked position.

10. The vehicle seat and headrest assembly according to claim 9, wherein the paddle biasing member is operatively connected to the paddle and to the seatback frame.

11. The vehicle seat and headrest assembly according to claim 9, wherein the paddle biasing member is a spring.

12. The vehicle seat and headrest assembly according to claim 5, wherein the paddle is disposed higher on the vehicle seat than the impact target.

13. The vehicle seat and headrest assembly according to claim 5, further including a pawl biasing member biasing the pawl toward the ratchet.

14. The vehicle seat and headrest assembly according to claim 13, wherein the pawl biasing member is operatively connected to the pawl and to the seatback frame.

15. The vehicle seat and headrest assembly according to claim 13, wherein the pawl biasing member is a spring.

16. A locking mechanism for a vehicle seat and headrest assembly, the headrest assembly having a cushion portion and being rotatably connected to a vehicle seatback frame, wherein a rearward force upon the headrest assembly causes the cushion portion to rotate forwardly, and wherein the locking mechanism is operatively connected to the headrest assembly and the seatback frame, the locking mechanism comprising:
- a ratchet attached to one of a vehicle seatback frame and a vehicle headrest assembly;
- a pawl attached to the other of the seatback frame and the headrest assembly, wherein when the pawl engages the ratchet, the locking mechanism is in a locked position wherein the headrest assembly is prevented from rotating, and wherein when the pawl does not engage the ratchet, the locking mechanism is in an unlocked position wherein the headrest assembly is permitted to rotate; and
- a paddle attached to one of the seatback frame and the headrest assembly, the paddle being in engagement with one of the ratchet and the pawl to move the one of the ratchet and the pawl, wherein a rearward force upon the paddle moves the locking mechanism to the locked position.

17. The locking mechanism according to claim 16, wherein removal of the rearward force upon the paddle causes the locking mechanism to move to the unlocked position.

18. The locking mechanism according to claim 16, wherein the pawl is slidably mounted to the seatback frame.

19. The locking mechanism according to claim 16, further including a pawl biasing member biasing the pawl toward the ratchet.

20. The locking mechanism according to claim 16, further including a paddle biasing member biasing the paddle against the pawl, thereby biasing the pawl away from the ratchet and moving the locking mechanism to the unlocked position.

* * * * *